May 12, 1931.  R. BAUER ET AL  1,805,159
PERCOLATING APPARATUS
Filed Sept. 30, 1929   3 Sheets-Sheet 3
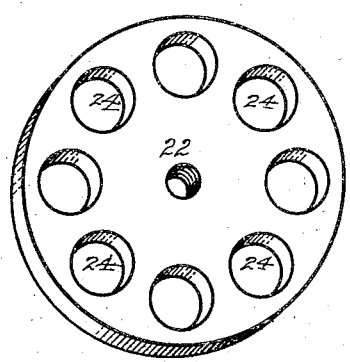
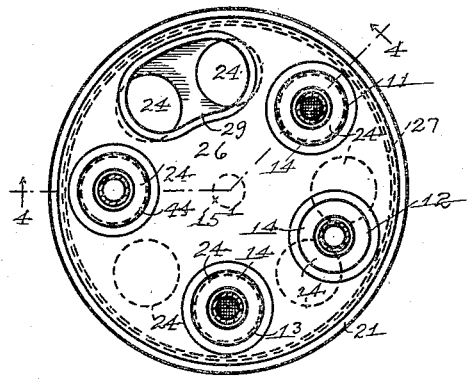
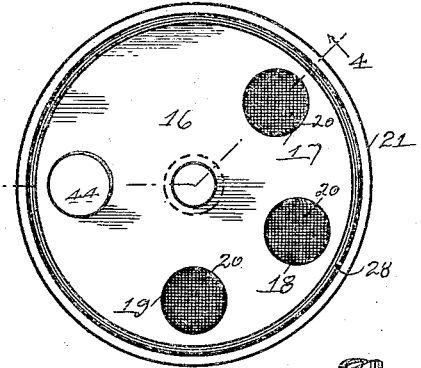
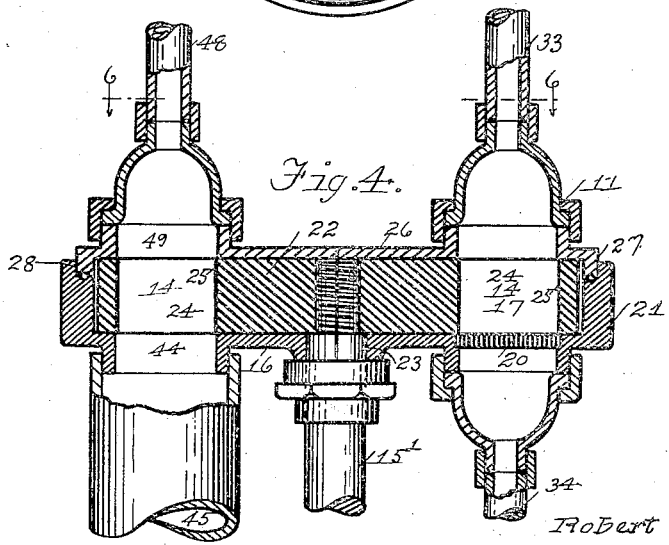
INVENTORS:
Robert Bauer
George J. Ludwig
BY Rice and Rice
ATTORNEYS
Witness:

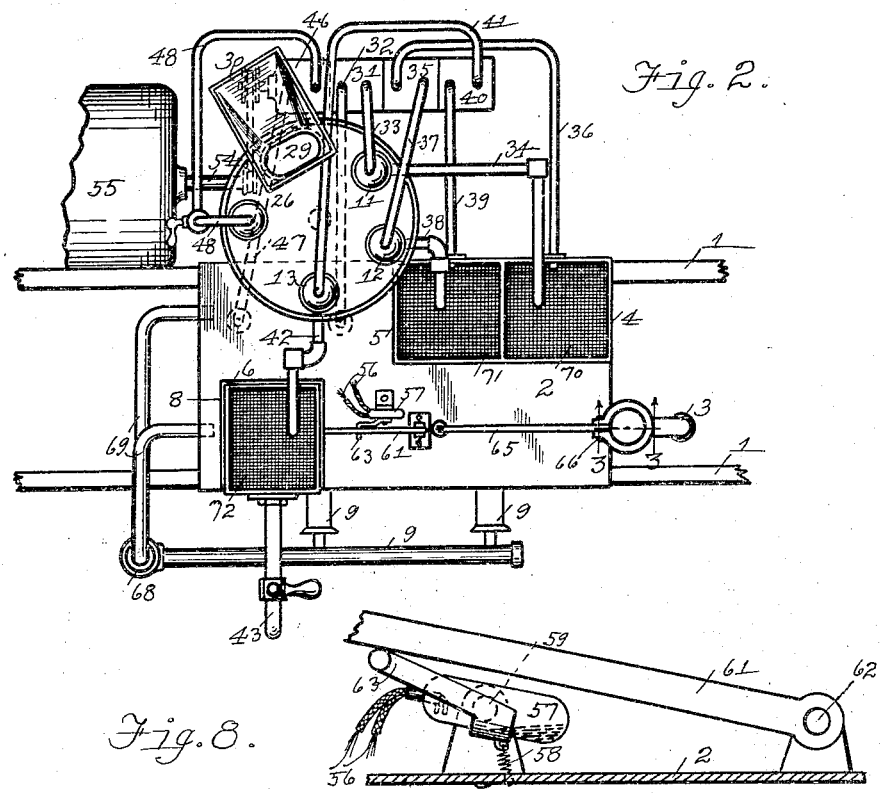
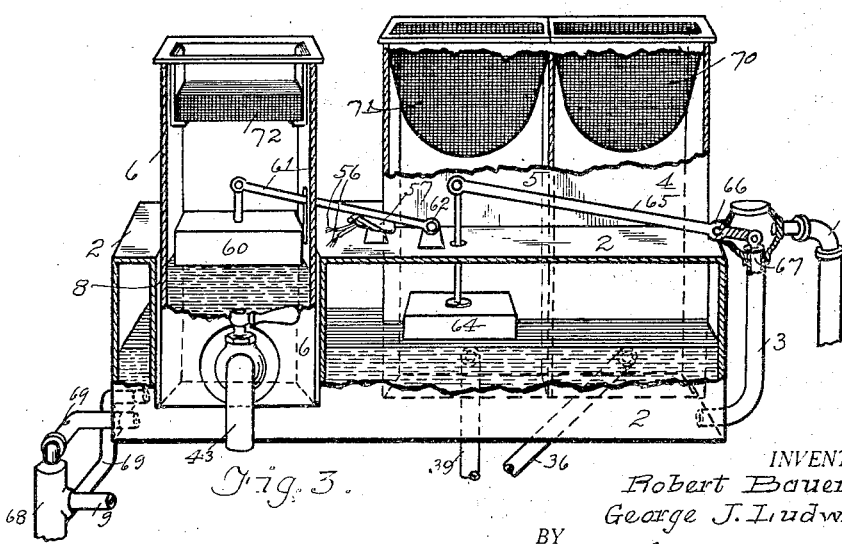

Patented May 12, 1931

1,805,159

UNITED STATES PATENT OFFICE

ROBERT BAUER AND GEORGE J. LUDWIG, OF GRAND RAPIDS, MICHIGAN

PERCOLATING APPARATUS

Application filed September 30, 1929. Serial No. 396,020.

The present invention relates to percolating apparatus, particularly such as is employed for making hot beverages, such as coffee; and its object is, generally, to provide an improved apparatus of that character; and more particularly, to provide in such apparatus a plurality of percolators through which the percolating liquid passes successively; and further, to provide improved means for supplying the percolators with measured amounts of the substance (as ground coffee) to be percolated therein; and further, to provide improved means for regulating the amount of prepared percolate, (as the coffee beverage) to the amount thereof expected to be consumed within a predetermined time, thus preventing an accumulation of the percolate unconsumed for so long a period as to develop undesirable qualities, such as tannic acid in coffee percolate.

These and any other and more specific objects hereinafter appearing are attained by, and the invention finds preferable embodiment in, the apparatus hereinafter particularly described in the body of this specification and illustrated by the accompanying drawings, in which:—

Figure 2 is a top plan view thereof;

Figure 3 is a front elevational view of certain parts of the same, the front walls of the liquid containers being partially broken away and certain parts being shown in central vertical section taken on line 3—3 of Figure 2;

Figure 4 is a vertical sectional view of a plurality of percolators and adjacent parts taken on radial planes corresponding to line 4—4 of Figures 5 and 6;

Figure 5 is a top plan view of the base plate thereof;

Figure 6 is a horizontal sectional view of parts thereof taken on line 6—6 of Figure 4;

Figure 7 is a view in perspective of the rotatable charging member thereof; and

Figure 8 is an elevational view of an electric circuit closer and opener or switch.

Figure 1:
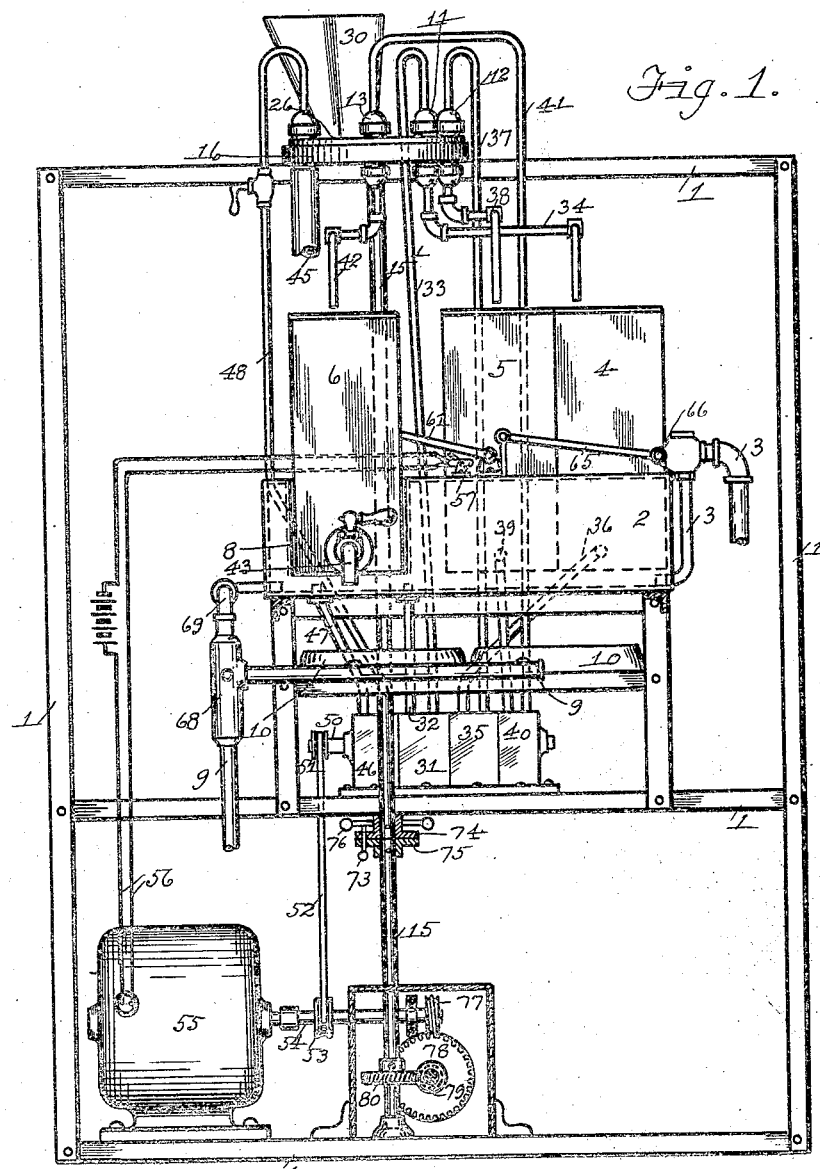
Figure 1 is a front elevational view of percolating apparatus used in making coffee beverage.

In the embodiment of the invention illustrated by these drawings a percolating apparatus or organization for preparing a hot beverage, such as coffee, is shown which apparatus and its operation are described as follows:

Upon a suitable supporting frame 1 is mounted a container or tank 2 to which water for making the beverage is supplied through a pipe 3. Seated in this water container and heated by the hot water therein are the percolate containers 4, 5 and 6, the last (6) containing the completely prepared beverage and being received in a recess or alcove 8 in the front side of the water container 2.

The water in container 2 and the percolate in containers 4, 5 and 6 are heated by gas supplied through the pipe 9 to the burner plates 10, 10 beneath the water container. Above the aforementioned parts, is located a combination or plurality (three in the shown construction) of percolators 11, 12, 13, the chamber 14 of each being adapted to contain a charge of the substance to be percolated, as ground coffee, and the percolators being circularly disposed in a horizontal plane about the axis of a vertical shaft 15.

This combination of percolators comprises a stationary base plate 16 having circular openings 17, 18, 19 therethrough with straining screens 20 constituting the bottoms of the chambers of the percolators respectively and supporting their charges of ground coffee, through which charges and screens the coffee percolate passes downwardly. This base plate has an upwardly-extending annular rim 21, receiving a flat circular member 22 lying on the base plate and rotatably carried by said shaft which extends through a bearing 23 in the base plate. This member 22 has a plurality (eight in the structure illustrated) of openings 24 therethrough adapted to be brought by the rotation of said member into registration with the screened openings of the base plate and forming in such registration the internal sidewalls 25 of the percolators, said screened openings as stated forming the bottoms thereof.

A cover plate 26 having an annular peripheral rim 27 seated in a rabbet 28 in the base plate's rim 21 overlies the rotatable member 22 and has a filling opening 29 through which the ground coffee is supplied from a suitable receptacle or stationary hopper 30 to the openings 24 of said member when such openings are brought by said member's rotation into registration with the filling opening 29. The amount of ground coffee thus supplied to each opening 24 of member 22 constitutes the measured charge of one of the percolators. This member 22 being rotated to bring the charges over and into registration with the base plate's screened openings, coffee percolate is formed by hot water passing from the tank or container 2 through the percolators successively.

In this process the hot water is thus passed or propelled by the following means and through the following course: A pump indicated at 31 draws water from container 2 through pipe 32 and propels it through pipe 33 to the first percolator 11. The coffee percolate therefrom flows through pipe 34 to the first percolate container 4. From this the percolate is drawn by pump indicated at 35 through pipe 36 and propelled through pipe 37 to the second percolator 12. The percolate therefrom flows through pipe 38 to the second percolate container 5. From this the percolate is drawn through pipe 39 by a pump indicated at 40 and is thereby propelled through pipe 41 to the third and last percolator 13. From this the completed percolate beverage flows through pipe 42 to the final percolate container 6 from which it may be withdrawn as desired through the faucet 43. The base plate 16 has another opening 44 through which the completely percolated or exhausted coffee grounds are discharged into the waste pipe 45 when the member 22 has been rotated far enough to bring the charges of exhausted coffee grounds into registration therewith. Such exhausted charges are expelled or flushed out by a pump indicated at 46 which draws water from container 2 through pipe 47 and propels it through pipe 48 and an opening 49 in the cover plate 26 in registration with the discharge pipe 45 leading from the discharge opening 44 through the base plate 23.

The indicated pumps are of rotary type and are driven by the shaft 50 having a sheave 51, which carries a belt 52 passing over the sheave 53 on the shaft 54 of an electric motor indicated at 55 in an electric circuit 56. This circuit has a circuit opener and closer or "switch" 57 of the mercoid type spring-pressed at 58 to circuit opening position seen in Figure 8. This switch is tilted on its pivot 59 to circuit closing position by a float 60 in percolate container 6, when the percolate beverage therein is exhausted to a certain level, the float being connected to a lever arm 61 pivotally mounted at 62 and adapted to engage and press downwardly the arm 63 on which the mercury container of the switch is carried. The water container 2 has a float 64 connected to a lever 65 fulcrumed at 66. This lever is connected to a valve 67 in the water pipe 3 for opening the same when the water in said container sinks to a certain low level.

The gas line 9 has an enlarged portion 68 containing a valve thermically operated by the heated water in container 2 passing through the pipe 69, so that the flow of gas to the burners 10 is shut off when the temperature of water in container 2 rises to a certain degree. The percolate containers 4, 5 and 6 are provided with removable screens 70, 71, 72 respectively to strain out solid particles from the percolate entering these containers.

The motor 55 turns the shaft 15 and member 22 through the worm 77 on the motor's shaft 54 which meshes with the worm wheel 78 on a shaft having a worm 79 meshing with the worm wheel 80 on shaft 15; and this motor in thus turning the member 22, brings a charge of ground coffee to the first percolator 11 and water passing therethrough extracts a portion of the essence or characteristic quality thereof, and then the same charge is brought to the next percolator 12 where the first percolate is passed through the same and an additional portion of such essence is extracted, and so on through the percolators successively.

The movement of the rotatable member 22 may be stopped however, if desired, by removing the pin 73 from the coupling members 74, 75 (shown in axial section in Figure 1) thus permitting the upper portion 15¹ of shaft 15 to be turned, as by the hand wheel 76, and stopped in any desired position.

We have shown three percolators in series, but any number may, of course, be comprised therein.

The invention being intended to be pointed out in the claims, is not to be limited to or by details of construction of the particular embodiment thereof illustrated by the drawings or hereinbefore described.

We claim:

1. In an organization of the character described, a plurality of percolators comprising: a base plate having circularly disposed openings therethrough provided with screens forming the bottoms of the percolators respectively and a vent for the percolated substance; a member on the base plate having circularly disposed openings therethrough forming the sides of the percolators respectively, said member's openings being adapted to contain a charge of the substance to be percolated and being brought into percolator-forming registration with the screened openings respectively by the rotation of said member.

2. In an organization of the character described, a plurality of percolators comprising: a base plate having circularly disposed openings therethrough provided with screens forming the bottoms of the percolators respectively and a vent for the percolated substance; a member on the base plate having circularly disposed openings therethrough forming the sides of the percolators respectively, said member's openings being adapted to contain a charge of the substance to be percolated and being brought into percolator-forming registration with the screened openings respectively by the rotation of said member; a cover plate on said member having an intake port for the substance to be percolated, said member's openings being brought into receiving registration with said port by the rotation of said member.

3. In an organization of the character described: a water container; a plurality of percolators; a plurality of containers receiving percolate from the percolators respectively; a pump for propelling water from the water container to one of the percolators; a pump for propelling percolate from the container of said percolator to another of said percolators; an electric motor for operating the pumps; a switch in the motor's electric circuit; a float in one of the percolate containers for operating the switch.

4. In an organization of the character described, a plurality of percolators comprising: a base plate having circularly disposed openings therethrough provided with screens forming the bottoms of the percolators respectively; a member on the base plate having circularly disposed openings therethrough forming the sides of the percolators respectively, said member's openings being adapted to contain a charge of the substance to be percolated and being brought into percolator-forming registration with the screened openings respectively by the rotation of said member; an electric motor for rotating said member; a switch in the motor's electric circuit; a float in one of the percolate containers for operating the switch.

5. In an organization of the character described; a percolator structure comprising: a base plate having an opening therethrough provided with a screen forming the bottom of the percolator; a rotatable member on the base plate having an opening therethrough forming the sides of the percolator and being adapted to contain a charge of the substance to be percolated and brought into percolator-forming registration with the screened opening by the rotation of said member.

6. In an organization of the character described, a percolator structure comprising: a base plate having an opening therethrough provided with a screen forming the bottom of the percolator and a vent for the percolated substance angularly spaced from the screened opening; a rotatable member on the base plate having an opening adapted to contain a charge of the substance to be percolated and brought into percolator-forming registration with the screened opening by the rotation of said member and into registration with the vent for discharging the percolated substance.

7. In an organization of the character described, a percolator structure comprising: a base plate having an opening therethrough provided with a screen forming the bottom of the percolator; a rotatable member on the base plate having an opening therethrough forming the sides of the percolator and being adapted to contain a charge of the substance to be percolated and brought into percolator-forming registration with the screened opening by the rotation of said member; a cover plate on said member having an intake port for the substance to be percolated, said member's opening being brought into receiving registration with said port by the rotation of said member.

8. In an organization of the character described, a percolator structure comprising: a base plate having an opening therethrough provided with a screen forming the bottom of the percolator and a vent for the percolated substance angularly spaced from the screened opening; a rotatable member on the base plate having an opening adapted to contain a charge of the substance to be percolated and brought into percolator-forming registration with the screened opening by the rotation of said member and into registration with the vent for discharging the percolated substance; a cover plate on said member having an intake port in registration with the vent.

9. In an organization of the character described, a percolator structure comprising: a base plate having an opening therethrough provided with a screen forming the bottom of the percolator and a vent for the percolated substance angularly spaced from the screened opening; a rotatable member on the base plate having an opening adapted to contain a charge of the substance to be percolated and brought into percolator-forming registration with the screened opening by the rotation of said member and into registration with the vent for discharging the percolated substance; a cover plate on said member having an intake port in registration with the vent; means for passing a stream of water through the port, the vent and the opening of said member in registration therewith for discharging the percolated substance.

In testimony whereof we have hereunto set our hands at Grand Rapids, Michigan, this 10th day of September, 1929.

ROBERT BAUER.
GEORGE J. LUDWIG.